United States Patent
Pollak

(10) Patent No.: US 6,635,309 B2
(45) Date of Patent: Oct. 21, 2003

(54) PROCESS FOR THE COLOR ENHANCEMENT OF GEMSTONES

(76) Inventor: Richard D. Pollak, 3133 Via de Caballo, Encinitas, CA (US) 92024

( * ) Notice: Subject to any disclaimer, the term of this patent is extended or adjusted under 35 U.S.C. 154(b) by 0 days.

(21) Appl. No.: 09/803,218

(22) Filed: Mar. 12, 2001

(65) Prior Publication Data

US 2002/0128145 A1 Sep. 12, 2002

(51) Int. Cl.⁷ .............................. B05D 1/12; B05D 3/02; C30B 29/00; A44C 17/00
(52) U.S. Cl. .................... 427/190; 427/192; 427/383.3; 501/86; 63/32; 428/426; 428/432
(58) Field of Search .......................... 427/180, 190–192, 427/217, 383.1, 383.3, 250, 255, 281, 255.37, 255.7, 397.7, 377; 428/15, 543, 426, 432, 539.5; 501/86; 63/32

(56) References Cited

U.S. PATENT DOCUMENTS 3,616,357 A  * 10/1971 Haynes
3,897,529 A  *  7/1975 Carr et al.
5,888,918 A     3/1999 Pollak .......................... 501/86

FOREIGN PATENT DOCUMENTS

BR      200001034    * 11/2001
SU        1686045    * 10/1991

* cited by examiner

*Primary Examiner*—Fred J. Parker
(74) *Attorney, Agent, or Firm*—Don E. Erickson

(57) ABSTRACT

In accordance with the present invention, there are provided methods for enhancing the color of gemstone(s) by subjecting a combination of a gemstone and at least one finely divided form of a selected treating agent including the element copper to a temperature in the range of about 700° C. up to about 1000° C., for a time period in the range of about 3 hours up to about 600 hours, under conditions suitable to enhance the color of the gemstone, wherein the treating agent consists of a finely divided form of the selected treating agent such as copper metal or copper oxide, and wherein said gemstone is topaz or sapphire and the enhanced color lies in the color spectrum of light yellow to red.

19 Claims, No Drawings

PROCESS FOR THE COLOR ENHANCEMENT OF GEMSTONES

FIELD OF THE INVENTION

The present invention relates to methods for enhancing the color of gemstones and to novel colored gemstones produced by invention methods.

BACKGROUND OF THE INVENTION

A variety of materials having the physical and aesthetic properties desirable for use as gemstones are widely available. However, many of these materials but do not always have an aesthetically pleasing appearance. A variety of procedures have been employed in the art to improve the physical and/or aesthetic properties of minerals, e.g., electron beam irradiation, Cobalt-60 irradiation, neutron bombardment, exposure to intense heat, and the like.

More recently, the inventor herein developed a process for enhancing a minerals usable as gemstones by subjecting a combination of a gemstone and at least one form of cobalt metal or cobalt oxide to conditions suitable to enhance the color of said gemstone, without causing a significant level of surface damage to said gemstone. U.S. Pat. No. 5,888,918 was issued to cover said process. Using said process chrysoberyl, garnet, sapphire and topaz were modified to have colors in the spectrum of from light green to dark blue, depending on the gemstone, the treating agent(s) and treating conditions employed. Quartz was modified to have a light pink to a dark pink color using the same cobalt metal/oxide process.

Although the methods of the prior art have been able to produce colors in gemstones ranging from green to blue, none of the state of the art processes have been able to produce gemstones outside the green to blue spectrum except with quartz. And specifically, treatment of the gemstones with cobalt and/or cobalt oxides prevent obtaining gemstones in the color of the present invention. In addition, the treatment process of the current invention results in gemstone enhancement occurring in a far shorter time period.

Therefore, it would be desirable to be able to readily impart predictably enhanced and/or modified colors to materials useful as gemstones employing readily practicable methods which do not suffer from the drawbacks of prior art methods and which produce other colors.

BRIEF DESCRIPTION OF THE INVENTION

In accordance with the present invention, methods have been developed for enhancing the color of minerals useful as gemstones. The methods include the process of subjecting the gemstones to a selected temperature while in the presence of a form of a selected metal, or metal oxide, such copper/copper oxide, for a selected period of time. Invention methods are relatively inexpensive to carry out, avoid the use of hazardous materials, and require no specialized equipment.

DETAILED DESCRIPTION OF THE INVENTION

In accordance with the present invention, there are provided methods for enhancing the color of gemstones, said methods comprising: subjecting a combination of a gemstone and at least one powdered (i.e., finely divided) form of copper metal or copper oxide to conditions suitable to enhance the color of said gemstone, without causing a significant level of surface damage to said gemstone. To achieve color enhancement according to the invention, gemstones are placed in a suitable vessel (e.g., a flat ceramic sheet, a crucible, and the like) which can withstand the exposure temperatures contemplated for use, with the gemstones completely surrounded by the treating agent(s) of choice. The vessel is then placed in a furnace capable of reaching and accurately maintaining the selected temperature. Upon treatment of the gemstones it then appears that the copper oxide or copper metal has either diffused or bonded with the surface of the gemstone. Although copper metal or copper oxide are the selected treating agents for the preferred embodiments of the invention, it should be noted that other metals and or metal oxides similarly impart a color that lies in the color spectrum of light yellow to red, e.g., iron, however copper metal or copper oxide appears to cause less surface damage to the gemstone.

A wide variety of minerals can be treated according to the present invention. Examples of suitable minerals contemplated for use herein, thereby rendering them useful as gemstones, include topaz, sapphire, and the like.

A wide variety of metals can be employed in combination with the selected copper metal or copper oxide employed in the invention process. Examples of suitable metals include transition metals, as well as other metals, which can modify the color imparted by the treating agent and/or the mineral being treated.

A wide variety of metals and/or metal oxides can also be employed in combination with the copper metal or copper oxide employed in the invention process, optionally in further combination with a plurality of the metals set forth hereinabove. Metal oxides are used that can modify the color imparted by the treating agent and/or the mineral being treated, or to dilute the coloring agent to enable control of the saturation of color to the host material, and thereby controlling the amount of surface damage that may occur on the surface of the gemstone. The selection of metal oxide depends on the selected gemstone, and the amount of damage that may occur on the surface of the gemstone. For example, aluminum oxide may work as a diluting agent, but because aluminum oxide reacts with copper, a lesser amount of copper reacts with topaz resulting is a less saturated color. On the other hand magnesium oxide serves as an excellent diluter.

Enhanced colors which can be imparted by the invention process can be varied based on such variables as the particular gemstone being treated, the particular treating agent (s) employed, the conditions to which the gemstones are subjected, and the like. For example, topaz can be modified to have a light yellow to orange color, or a light pink to reddish color, depending on the treating agent(s) and treating conditions employed. Additionally, increasing or reducing the amount of oxygen present during treatment may affect the color itself. For example, after treating the topaz in copper to impart a yellow color to the topaz, and then subjecting the enhanced topaz in a reducing atmosphere at about 800° C. for about 4 hours, the color will begin to develop a red hue. Sapphire can be treated to have a light yellow to an orange color, and may be treated at a higher temperature than topaz. In general silicate minerals at high temperature will reduce to glass, where sapphire, being an oxide mineral, can withstand a much higher temperature.

A wide range of treating conditions can be employed in the practice of the present invention. Typically conditions suitable to enhance the color of a gemstone, without causing a significant level of surface damage thereto, comprise subjecting the combination of gemstone and at least one powdered (i.e., finely divided) form of copper metal or copper oxide to a temperature in the range of about 800° C. or lower up to about 1000° C. It has been noted with the current process that gemstones may be treated at a temperature lower than 800° C., however, the treatment time will be extended. For example, treatment at about 725° C. will result in a treatment time of approximately 72 hours, more or less, depending on the intensity of the color desired. On the other hand treatment at or about 700° C. may require a significant increase in treatment time. Typically such contacting is carried out at ambient pressure.

Generally, longer exposure times and/or higher exposure temperatures lead to a greater intensity of color being imparted to the mineral being treated, as well as impacting the degree of color saturation achieved by the process. As readily recognized by those of skill in the art, higher treating temperatures are also possible (i.e., >1250° C.), i.e., sapphire, while also providing higher color saturation. The resulting treated gemstone could be polished to remove the surface damage, thereby providing a color-enhanced gemstone with a satisfactory surface finish.

As readily recognized by those of skill in the art, the particular temperature ranges and exposure times will not only vary as a function of the intensity, but also on the level of color saturation desired. In addition, the ability of a given mineral to withstand such exposures without suffering significant fracturing must also be considered. Thus, for example, topaz would not typically be subjected to conditions as rigorous as sapphires.

In a particular aspect of the invention, the gemstone to be treated can optionally be contacted with a variety of post-treating agents (e.g., oxygen, reducing agents, and the like) before being subjected to the above-described conditions suitable to enhance the color of a gemstone. By post-treating the gemstones in an oxygen atmosphere, the gemstones may be made more yellow, while post-treating the gemstones in a reducing atmosphere, the gemstones begin to take on a red tint, ranging from orange through pink to red.

While gemstones can be used in the invention treating process without any special pretreatment, it is presently preferred that gemstones subjected to the practice of the invention be cleaned prior to being subjected to said conditions suitable to enhance the color thereof. Suitable cleaning processes are well known to those of skill in the art, and include washing in water, aqueous acid, organic media, and the like.

Gemstones treated according to the present invention can be used directly, or they can be subjected to further treatment and/or washing conditions. It is presently preferred that the treated gemstone be cleaned after being subjected to said conditions suitable to enhance the color of a gemstone. Such cleaning can be accomplished in a variety of ways, e.g., by washing the treated gemstones with aqueous media or with organic solvents (e.g., acetone), by wiping the gemstones with a soft cloth (e.g., a polishing cloth), by polishing the surface of the gemstones with a suitable abrasive, and the like.

While the present description contain many specificities, these should not be construed as limitations on the scope of the invention, but rather as an exemplification of some preferred embodiments thereof.

I claim:

1. A method for enhancing the color of gemstone(s), the method comprising: subjecting a combination of a gemstone and at least one finely divided form of a selected treating agent to a selected temperature for a selected period of time under conditions suitable to enhance the color of said gemstone; and wherein the selected treating agent primarily includes the element copper.

2. The method of claim 1 wherein the gemstone is sapphire or topaz.

3. The method according to claim 1, wherein the selected temperature is in the range from about 700° C. up to about 1250° C.

4. The method of claim 1 wherein the selected time period is in the range from about 3 hours up to about 600 hours.

5. The method according to claim 1, wherein the gemstone is cleaned prior to being subjected to the conditions suitable to enhance the color of said gemstone.

6. The method of claim 1 wherein the element copper is in the form of copper metal.

7. The method of claim 1 wherein the element copper is in the form of copper oxide.

8. The method according to claim 1, wherein subsequent to the treatment in the presence of the treating agent, the gemstone is subjected to a temperature in the range of about 700° C. up to about 1250° C. for a time period in the range of about one-quarter hour up to about 100 hours in a reducing environment.

9. The method according to claim 1, wherein subsequent to the treatment in the presence of the treating agent, the gemstone is subjected to a temperature in the range of about 700° C. up to about 1250° C. for a time period in the range of about one-quarter hour up to about 100 hours in an oxidizing environment.

10. A method for enhancing the color of gemstone(s), the method comprising: subjecting a combination of a gemstone and at least one finely divided form of a selected treating agent to a temperature in the range of about 700° C. up to about 1250° C., for a time period in the range of about 3 hours up to about 600 hours, under conditions suitable to enhance the color of the gemstone, and wherein the treating agent primarily includes a finely divided form of the element copper.

11. The method according to claim 10 wherein the gemstone is cleaned prior to being subjected to the conditions suitable to enhance the color of said gemstone.

12. The method according to claim 10 wherein, subsequent to the treatment in the presence of the selected treating agent, said gemstone is subjected to a temperature in the range of about 700° C. up to about 1250° C. in a reducing environment for a time period in the range of about one-quarter hour up to about 100 hours.

13. The method according to claim 10 wherein, subsequent to said treatment in the presence of the treating agent, the gemstone is subjected to a temperature in the range of about 700° C. up to about 1250° C. in an oxidizing environment for a time period in the range of about one-quarter hour up to about 100 hours.

14. The method according to claim 10 wherein the element copper is in the form of copper metal.

15. The method according to claim 10 wherein the element copper is in the form of copper oxide.

16. A color enhanced gemstone comprising a gemstone having a color enhancing agent diffused into an outer surface of the gemstone and wherein the gemstone is sapphire or topaz and the enhancing agent is copper metal or copper oxide.

17. The color enhanced gemstone according to claim 16, wherein said enhanced color lies in the color spectrum of yellow to red.

18. A color enhanced gemstone comprising a gemstone having a surface wherein at least the surface of the gemstone has chemically bonded to a color enhancing agent, and wherein the gemstone is sapphire or topaz and the enhancing agent is copper metal or copper oxide.

19. The color enhanced gemstone according to claim 18, wherein the enhanced color lies in the color spectrum of yellow to red.

* * * * *